United States Patent [19]

Blonder

[11] Patent Number: 5,552,821
[45] Date of Patent: Sep. 3, 1996

[54] METHOD OF AND SYSTEM FOR STEREOSCOPIC TELEVISION

[76] Inventor: Isaac S. Blonder, 9 Beaver Hill Rd., Morganville, N.J. 07751

[21] Appl. No.: 463,193

[22] Filed: Jun. 5, 1995

[51] Int. Cl.$^6$ .................................................. H04N 13/00
[52] U.S. Cl. .................... 348/47; 348/54; 348/42
[58] Field of Search .......................... 348/42, 43, 44, 348/47, 51, 53, 57, 58

[56] References Cited

U.S. PATENT DOCUMENTS 4,954,890  9/1990  Park ............................................ 348/58
5,239,372  8/1993  Lipton ......................................... 348/58

Primary Examiner—Tommy P. Chin
Assistant Examiner—A. Au
Attorney, Agent, or Firm—Rines and Rines

[57] ABSTRACT

A hybrid stereoscopic television method and system wherein a high definition television (HDTV) camera and a standard lower definition television camera (NTSC, PAL, etc.) are used as a hybrid stereoscopic pair, taking advantage of the physiological reaction of the brain of a viewer equipped with crossed polarizers or the like and viewing a screen of projecting complementarily polarized images from the cameras, imaging the composite images to be only the HDTV image, but in stereoscopic illusion.

5 Claims, 1 Drawing Sheet

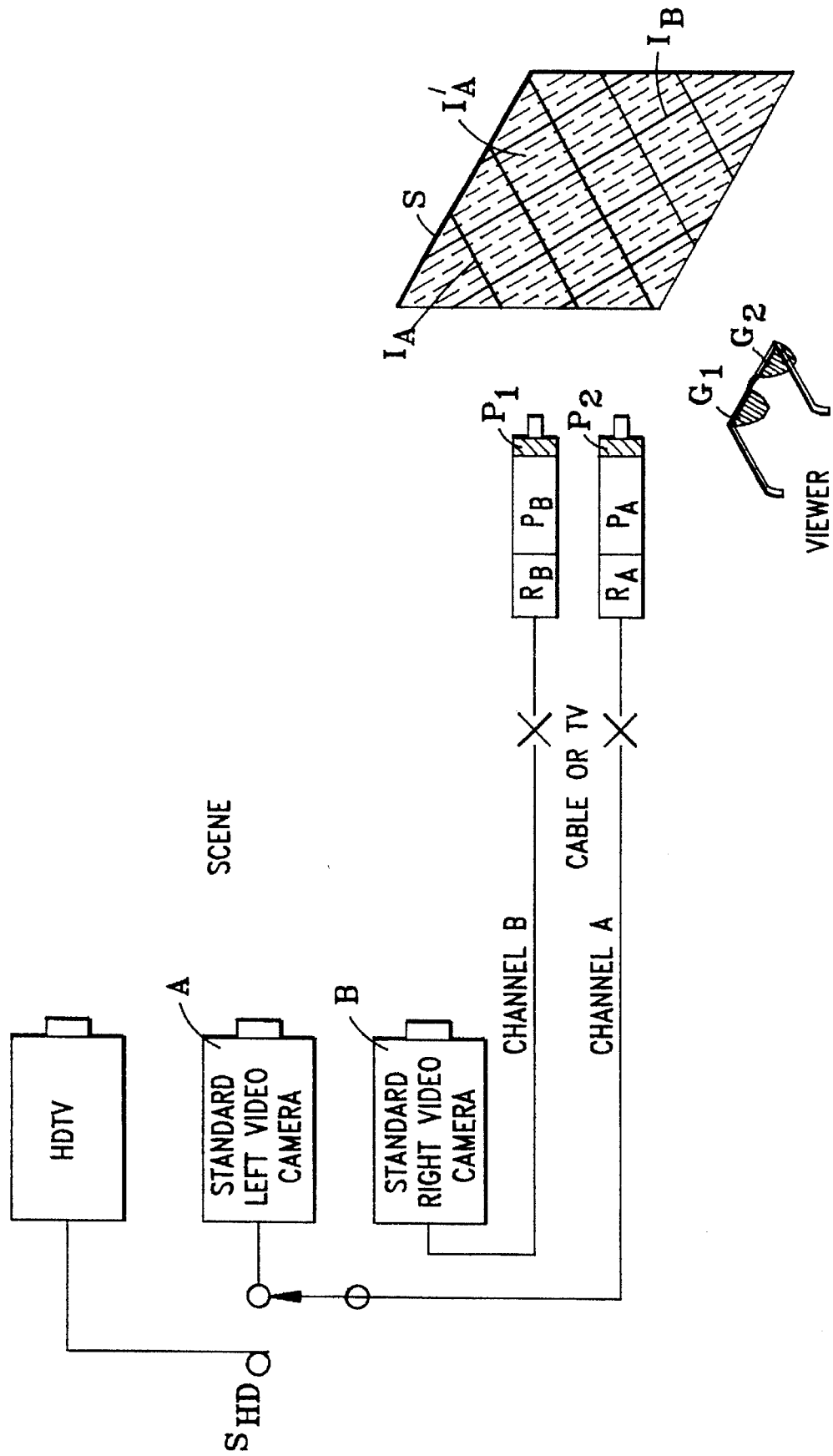

METHOD OF AND SYSTEM FOR STEREOSCOPIC TELEVISION

The present invention relates to stereoscopic television transmission and reception, being more particularly directed to improvements for reducing the cost of high definition stereoscopic television while providing simultaneous non-stereoscopic viewing as well.

BACKGROUND

The overall concept of broadcasting a pair televised stereoscopically signals from adjacent video cameras along corresponding channels and projecting the revised images upon a screen through crossed polarizer or the like for viewing with complimentary crossed-polarizers has been earlier proposed and demonstrated. Experimental over-the-air transmission and reception of dual channel video have now been successfully demonstrated in the greater New York area by Blonder Broadcasting Corporation, assignee of this invention.

With the advent of costly high definition television (HDTV—1000 line, approximately 2 million pixels), the prospect of stereoscopic HDTV broadcasting and reception and display of high definition video does not seem economically feasible for large sectors of potential consumers.

It is to the solution of this problem, with greatly reduced cost, and while leaving flexibility for ordinary HDTV and/or also NTSC (or PAL, etc.) standard video presentation (approximately 400 lines, 400 thousand pixels for NTSC) that the present invention is presently directed.

OBJECTS OF INVENTION

It is an object of the invention to provide a new and improved and less costly method or technique and system for high definition stereoscopic television, and to do so without inhibiting non-stereoscopic viewing in either HDTV or NSTC or other standard format, as well.

Other and further objects will be explained hereinafter and more fully delineated in the appended claims.

SUMMARY

In summary, however, from one of its important viewpoints, the invention embraces a method of stereoscopic high definition television (HDTV) transmission, reception and display, that comprises, a single HDTV camera televising a scene and transmitting the high resolution image along a first channel; a single standard camera of lower definition televising the scene from an adjacent position and transmitting its image along a second channel; complementarily optically projecting the two images upon a screen; and viewing selectively with each eye the respective complimentary images on the screen to see a favored physiological predomination of the high definition image and in stereoscopic fashion.

Preferred and best mode designs and techniques are hereinafter described.

DRAWINGS

The invention will now be described in connection with the accompanying drawing, the single FIGURE of which is a schematic block and circuit diagram illustrating the invention implemented in preferred form.

DESCRIPTION OF INVENTION

Referring to the drawing, a pair of adjacent standard inexpensive stereoscopic video cameras (such as NTSC, PAL, etc.) are shown at A and B, serving as a stereoscopic pair of cameras for televising and transmitting a stereo pair of video images of a scene, respectively fed along a pair of channels A and B, as by cable or over-the-air TV. The transmitted video Stereoscopic images are reconstructed at appropriate receivers $R_A$ and $R_B$ and projected through a corresponding pair of projectors $P_A$ and $P_B$ through complementary or crossed polarizers $P_1$ and $P_2$ upon a screen S, as in a public room, such as a restaurant, lounge or bar. Viewers equipped with corresponding complementary or crossed polarizer glasses $G_1$ and $G_2$ will obtain stereoscopic or three-dimensional visualization effects from the selectively viewed pair of projected images $I_A$ and $I_B$ with the respective eyes.

In accordance with one feature of the present invention, but a single expensive HDTV camera, so-labeled, may be substituted for one of the standard NTSC (PAL, etc.) cameras (shown as the camera A), as by,switching channel A to switch position $S_{HD}$, producing on the screen S a polarized HDTV image $I_A'$ and a complementary polarized standard lower quality image $I_B$.

It has been found that when two different quality, definition or resolution images are thus viewed by the two eyes of a human, the brain physiologically causes a strong and dominant resultant impression of the high quality image only, using depth information from the lower quality or definition imaging eye in the overall effect, but actually predominantly favoring the high quality or definition imaging eye. This phenomenon causes the viewer to "see" just the high definition image $I_A'$ on the screen S, but stereoscopically—and with this hybrid system and without the necessity for the expense of a second HDTV stereoscopic camera. More than this, other viewers without selective glasses $G_1$ and $G_2$ will simultaneously have the benefit of the predominating additional resolution of the superposed HDTV image. It has also been found that the standard lower quality image $I_B$ may even be in black and white, with a color HDTV image predominating in the brain's interpretation in stereoscopic color.

While complementary polarizers or colored glasses are illustrated, complementary or adjacent lenticular devices crystal shutter glasses and similar devices may also be used.

Further modifications will also occur to those skilled in this art, and such are considered to fall within the spirit and scope of the invention as defined in the appended claims.

What is claimed is:

1. A method of stereoscopic high definition television (HDTV) transmission, reception and display, that comprises, a single HDTV camera televising a scene and transmitting the a high definition image along a first channel; a single standard camera of lower definition televising the scene from an adjacent position and transmitting its image along a second channel; complementarily optically projecting the two images upon a screen; and viewing selectively with each eye the respective complimentary images on the screen to see a favored physiological predomination of the high definition image and in stereoscopic fashion.

2. A method as claimed in claim 1 and in which non-selective viewing of the two images on the screen is effected by some viewers with predomination of the HDTV non-stereoscopic image, and simultaneously with the selective viewing of the stereoscopically appearing HDTV image by other stereo-image viewers.

3. A method as claimed in claim 1 and in which the lower definition image is in black and white and the high definition image is in color.

4. A stereoscopic high definition television (HDTV) system having, in combination, a single HDTV camera connected to transmit its high definition image of a scene along a first channel; a standard lower definition camera adjacent the HDTV camera connected to transmit its image of the scene along a second channel; means connected to the first and second channels for reconstructing and respectively projecting the high definition and lower definition images upon a screen through complementary optical systems upon a screen; and means for enabling a viewer selectively to see the respective images on the screen through respective eyes to see a physiological predomination of the high definition image and in stereoscopic fashion.

5. A system as claimed in claim 4 and in which the system enables other viewers simultaneously to view the screen without separate image selection predominantly to see the high definition image.

* * * * *